United States Patent
Cui et al.

(10) Patent No.: US 12,266,150 B2
(45) Date of Patent: Apr. 1, 2025

(54) AUTOMATICALLY GENERATING TRAINING DATA SETS FOR OBJECT RECOGNITION

(71) Applicant: Microsoft Technology Licensing, LLC, Redmond, WA (US)

(72) Inventors: Dehua Cui, Redmond, WA (US); Albert Thambiratnam, Redmond, WA (US); Ming Zhong, Redmond, WA (US); Wenhui Zhang, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 962 days.

(21) Appl. No.: 17/292,882

(22) PCT Filed: Dec. 12, 2018

(86) PCT No.: PCT/CN2018/120733
§ 371 (c)(1),
(2) Date: May 11, 2021

(87) PCT Pub. No.: WO2020/118584
PCT Pub. Date: Jun. 18, 2020

(65) Prior Publication Data
US 2021/0406595 A1 Dec. 30, 2021

(51) Int. Cl.
*G06V 10/764* (2022.01)
*G06F 18/20* (2023.01)
(Continued)

(52) U.S. Cl.
CPC .......... *G06V 10/764* (2022.01); *G06F 18/214* (2023.01); *G06F 18/23* (2023.01);
(Continued)

(58) Field of Classification Search
CPC ...... G06F 18/23; G06F 18/214; G06F 18/251; G06N 5/02; G06V 10/764; G06V 20/60
See application file for complete search history.

(56) References Cited

U.S. PATENT DOCUMENTS

| | | | |
|---|---|---|---|
| 2010/0299132 A1 | 11/2010 | Dolan et al. | |
| 2011/0116690 A1* | 5/2011 | Ross | G06V 40/173 382/118 |
| 2018/0189325 A1 | 7/2018 | Hohwald et al. | |

FOREIGN PATENT DOCUMENTS

| | | |
|---|---|---|
| CN | 102439596 A | 5/2012 |
| CN | 104376116 A | 2/2015 |

(Continued)

OTHER PUBLICATIONS

Fergus, Robert, et al. "Learning object categories from google's image search." Tenth IEEE International Conference on Computer Vision (ICCV'05) vol. 1. vol. 2. IEEE, 2005. (Year: 2005).*

(Continued)

*Primary Examiner* — Benjamin P Geib
(74) *Attorney, Agent, or Firm* — Schwegman Lundberg & Woessner, P.A.

(57) ABSTRACT

The present disclosure provides method and apparatus for automatically generating a training data set for object recognition. Profile information of a plurality of objects may be obtained. For each object among the plurality of objects, a group of initial images associated with the object may be collected based on identity information of the object included in profile information of the object. The group of initial images may be filtered to obtain a group of filtered images associated with the object. A group of training data pairs corresponding to the object may be generated through labeling each of the group of filtered images with the identity (Continued)

information of the object. The group of training data pairs may be added into the training data set.

17 Claims, 12 Drawing Sheets

(51) Int. Cl.
*G06F 18/214* (2023.01)
*G06F 18/23* (2023.01)
*G06F 18/25* (2023.01)
*G06N 5/02* (2023.01)
*G06V 10/82* (2022.01)
*G06V 20/62* (2022.01)
*G06V 40/16* (2022.01)

(52) U.S. Cl.
CPC ............ *G06F 18/251* (2023.01); *G06F 18/29* (2023.01); *G06N 5/02* (2013.01); *G06V 10/82* (2022.01); *G06V 20/62* (2022.01); *G06V 40/16* (2022.01)

(56) References Cited

FOREIGN PATENT DOCUMENTS

| CN | 104463202 A | 3/2015 |
|---|---|---|
| CN | 102804208 A | 8/2016 |

OTHER PUBLICATIONS

"European Extended Search Report Issued in Application No. 18943328.7", Mailed Date: Jun. 23, 2022, 7 Pages.
"International Search Report and Written Opinion Issued in PCT Application No. PCT/CN18/120733", Mailed Date: Sep. 11, 2019, 9 Pages.
"Office Action Issued in Chinese Patent Application No. 201880092391. 0", Mailed Date: Jul. 28, 2023, 11 Pages.
Notice of second examination Received for Chinese Application No. 201880092391, mailed on Apr. 16, 2024, 11 pages.
Communication pursuant to Rules 70(2) and 70a(2) EPC Received for European Application No. 18943328.7, mailed on Jul. 12, 2022, 01 page.
Notice of Third Office Action Received for Chinese Application No. 201880092391.0, mailed on Jun. 28, 2024, 10 pages. (English Translation Provided).

* cited by examiner

AUTOMATICALLY GENERATING TRAINING DATA SETS FOR OBJECT RECOGNITION

CROSS-REFERENCE TO RELATED APPLICATION

This application is a U.S. National Stage Filing under 35 U.S.C. 371 of International Patent Application Serial No. PCT/CN2018/120733, filed Dec. 12, 2018, and published as WO 2020/118584 A1 on Jun. 18, 2020, which application and publication are incorporated herein by reference in their entirety.

BACKGROUND

Object recognition techniques are increasingly employed in many fields, which may comprise classification and detection processes. The object recognition may comprise recognitions of individual objects or category objects. An example of object recognition is face recognition, which may recognize respective face of each person shown on one or more image, for example, recognizing that there is a person represented by name A, a person represented by name B and a person whose name unknown, in which they have different faces. Another example of object recognition is category recognition, which may recognize different categories of objects, for example, recognizing that there are a person, a dog, a cat, a flower, etc.

SUMMARY

This Summary is provided to introduce a selection of concepts that are further described below in the Detailed Description. It is not intended to identify key features or essential features of the claimed subject matter, nor is it intended to be used to limit the scope of the claimed subject matter.

Embodiments of the present disclosure propose method and apparatus for automatically generating a training data set for object recognition. Profile information of a plurality of objects may be obtained. For each object among the plurality of objects, a group of initial images associated with the object may be collected based on identity information of the object included in profile information of the object. The group of initial images may be filtered to obtain a group of filtered images associated with the object. A group of training data pairs corresponding to the object may be generated through labeling each of the group of filtered images with the identity information of the object. The group of training data pairs may be added into the training data set.

It should be noted that the above one or more aspects comprise the features hereinafter fully described and particularly pointed out in the claims. The following description and the drawings set forth in detail certain illustrative features of the one or more aspects. These features are only indicative of the various ways in which the principles of various aspects may be employed, and this disclosure is intended to include all such aspects and their equivalents.

BRIEF DESCRIPTION OF THE DRAWINGS

The disclosed aspects will hereinafter be described in connection with the appended drawings that are provided to illustrate and not to limit the disclosed aspects.

DETAILED DESCRIPTION

The present disclosure will now be discussed with reference to several example implementations. It is to be understood that these implementations are discussed only for enabling those skilled in the art to better understand and thus implement the embodiments of the present disclosure, rather than suggesting any limitations on the scope of the present disclosure.

Nowadays, object recognition technology has been got more and more attention by various companies or fields in the worldwide. However, there are some challenges in the object recognition when preparing or collecting training data for object recognition. For example, one challenge may be lack of valid training data and it is very expensive and slow to collect training data through hand labeled by people. Further, collecting training data by people may cause some problems, such as privacy protection for people and being illegal.

Embodiments of the present disclosure may propose a method and apparatus for collecting training data for object recognition automatically. For example, the training data may be collected or generated by leveraging search graph and/or knowledge graph through computer rather than labeling manually through people, which can collect a large amount of data substantially than that collected through traditional method, and result in reduced cost and improved efficiency.

Figure 1:
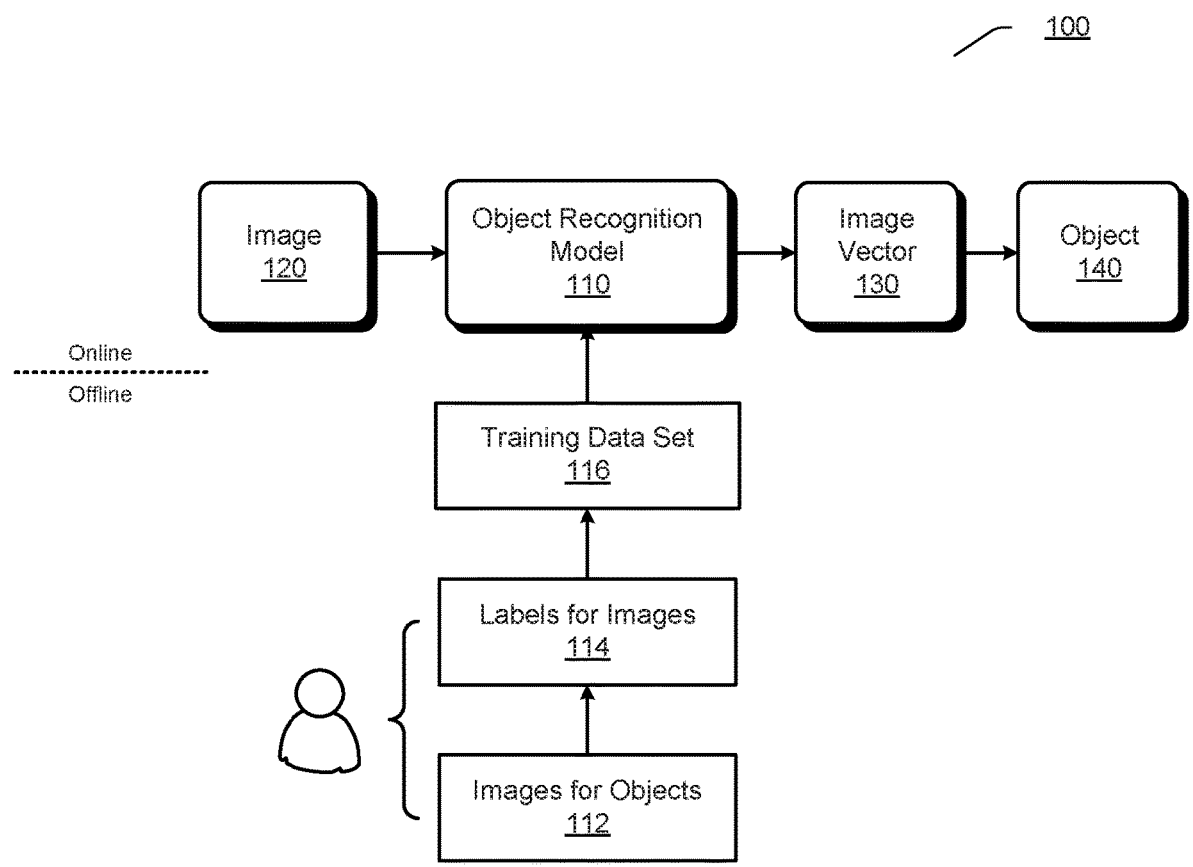
FIG. 1 illustrates an existing exemplary architecture for performing object recognition.

FIG. 1 illustrates an existing exemplary architecture 100 for performing object recognition.

As shown in FIG. 1, an image 120 may be provided to and processed by an object recognition model 110. The object recognition model 110 may output image vector 130 by performing any suitable object recognition technique on the image 120. The image vector 130 may be mapped to or may reflect an object 140. The mapped object 140 may be outputted corresponding to the inputted image 120.

The object recognition model 110 may be trained through a training data set 116. The training data set 116 may be obtained by collecting images for objects 112 and generating labels for the images 114 through people. Herein the labels for the images 114 may comprise identity information, such as personal information and/or category information. In some examples in which the objects are people, the images for objects may comprise images showing faces of people, and respective label for each image may comprise a label shown as personal information, for example but not limited to, name of the person. In some other examples in which the objects are categories, such as cat, dog, flower and so on, the images for objects may comprise images showing various categories, and the label for each image may comprise the respective category, such as cat, dog, flower, etc. The training data set 116 may be obtained online or offline, for example depending on practice requirements.

Figure 2:
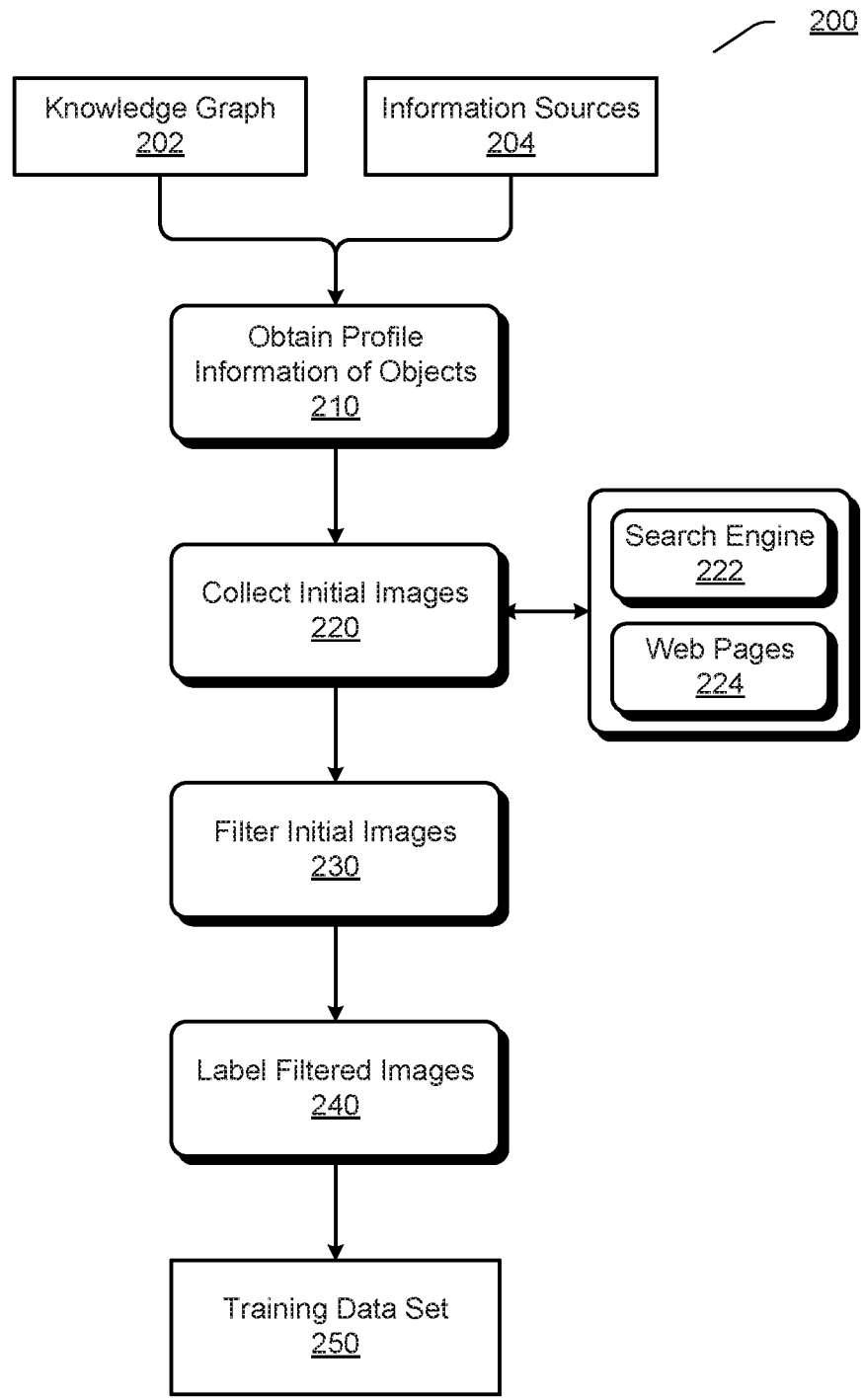
FIG. 2 illustrates an exemplary general process for generating training data set for object recognition according to an embodiment.

FIG. 2 illustrates an exemplary general process 200 for generating training data set for object recognition according to an embodiment.

At 210, profile information of various objects may be obtained from knowledge graph 202 and/or information sources 204. In particular, respective profile information of each object may be obtained. The profile information of objects may include profile images and/or identity information of objects. The profile images may include but not limited to a profile photo of a person or a kind of animal or plant for the object. The identity information may include personal information and category information. The personal information may include but not limited to the person's name, gender, age, home address, employer information, occupation, and so on. The category information may include but not limited to the category's name, or subcategory's name, characteristics of the category, and so on. The examples of the category's name may be represented as dog. The example of the corresponding subcategory's name may be represented as Huskie. The knowledge graph 202 may be pre-established and may be generated from such as Wikipedia, Baidubaike, Internet Movie Database (IMDB), and so on. The information sources 204 may be on the network.

At 220, as for each object, a group of initial images associated with the object may be collected based on the profile information of the object. For example, the initial images associated with the object may be collected based on identity information of the object included in the profile information. In some examples, the initial images may be collected by searching for various initial images associated with the object on the network through a search engine 222 being capable of searching images. In some other examples, the initial images may be collected by identifying initial images associated with the object from at least one web page 224, such as collected by a crawler to crawl from at least one web page. For example, identifying the initial images associated with the object may comprise: determining whether the at least one web page 224 comprises at least one named entity corresponding to the object through named entity extraction algorithm, extracting a candidate image from the at least one web page, calculating relevance between the candidate image and a profile image in the profile information of the object, and if the relevance meets a predetermined criterion, determining the candidate image as an initial image associated with the object. In some examples, the named entity extraction algorithm may be implemented by a named entity extraction model through Natural Language Processing (NLP) techniques, such as Bidirectional Long Short-Term Memory (Bi-LSTM), Bidirectional Encoder Representation from Transformers (BERT) model, and so on. The named entity extraction algorithm may be utilized to find the object's name in a web-page on which an image is shown. In some examples, if there are multiple names found in the web-page, then the initial image shown on this web-page may be compared with a profile image in the knowledge graph to determine a matched name of the object from the multiple names. Herein the predetermined criterion may include but not limited to more than a threshold, less than a threshold, or in a range of thresholds.

For example, when an object is a person whose name is Kobe Brynt, that is, the identity information included in the profile information of the object is a name of "Kobe Brynt", a plurality of initial images associated with Kobe Brynt may be collected through a search engine 222 searched on the network and/or by identifying initial images associated with Kobe Brynt from one or more web pages 224.

At 230, the group of initial images may be filtered to obtain filtered images associated with the object. For example, noisy images may be filtered out from the initial images. The noisy images may be considered as those initial images whose relevance with the object cannot satisfy predetermined criterion or as outlier images from the initial images based on clustering process.

In some examples, for each initial image, the filtering out of noisy images may comprise: calculating at least one of: a first relevance between a profile image of the object included in the profile information of the object and the initial image; and a second relevance between the identity information of the object and description information of the initial image; if the first relevance and/or the second relevance cannot meet a predetermined criterion, determining the initial image as an noisy image and removing the initial image from the group of initial images. In some examples, if it is considered both the first relevance and the second relevance, and one is satisfied a predetermined criterion while another is not satisfied, respective weight may be assigned to each of the first relevance and the second relevance, and whether the initial image may be determined as a noisy image may be further based on the weight of each relevance.

In some other examples, the filtering out of noisy images may comprise: performing clustering process to the group of initial images to identify at least one outlier image; and determining the at least one outlier image as a noisy image and removing the at least one outlier image from the group of initial images. Herein the clustering process may be performed through image grouping algorithm, such as density based clustering algorithm, which is a common clustering algorithm, and herein the detailed description for such algorithm may be omitted for simplicity.

At 240, each of the filtered images may be labeled with the identity information of the object to generate a group of training data pairs corresponding to the object. For example, a filtered image may be labeled with a person name or a category name of the object. In some examples, the training data pairs may be shown as a pair of <image, identity information>.

At 250, a training data set may be generated based on the group of training data pairs, for example, adding the group of training data pairs into the training data set.

It should be understood that, an exemplary face recognition model may be described below in FIG. 3 as an example of the object recognition model, and any other object recognition model for individual object may be similar to the face recognition model and the detailed description for the other object recognition model may be omitted herein for simplicity.

Figure 3:
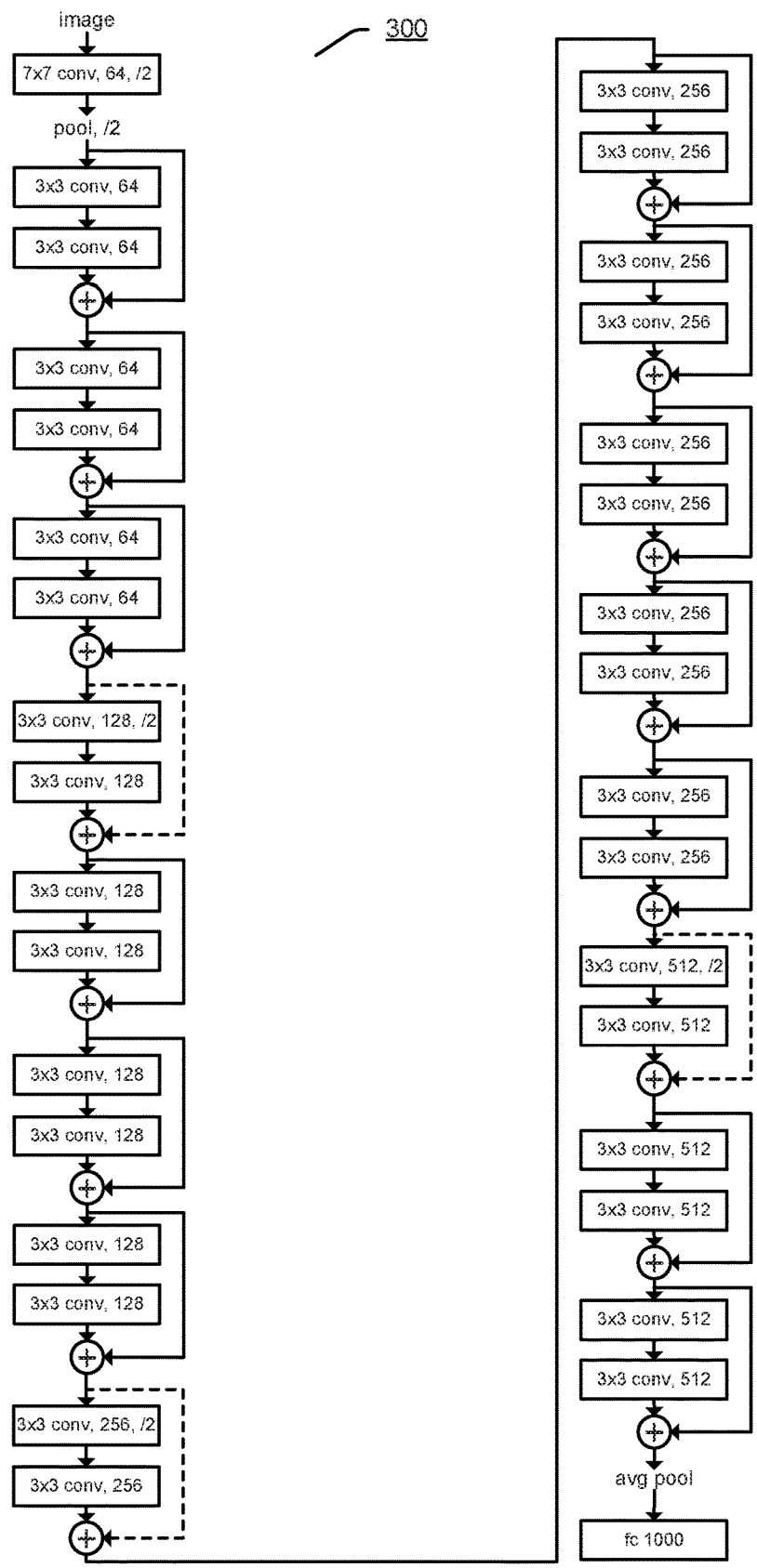
FIG. 3 illustrates an exemplary residual network for a face recognition model according to an embodiment.

FIG. 3 illustrates an exemplary residual network 300 for a face recognition model according to an embodiment. The residual network 300 has 34 layers, which may provide a relative good accuracy and fast training/testing.

In FIG. 3, for example, "3*3 cony, 64" denotes that there are 64 filters, and each filter has a convolutional kernel or function and is in a scale of 3*3 pixels. "/2" denotes a double stride. "pool" denotes a pooling operation, and "avg pool" denotes an average pooling operation. "fc 1000" denotes a full-connected layer with 1000 output symbols.

Instead of performing "fc 1000", the embodiments of the present disclosure may use an output of the average pooling operation as a dense vector representation for an image input.

It should be understood that the ResNet is an exemplary technique that can be adopted for a face recognition model, and any other technique may be adopted in the face recognition model, such as, DenseNet, AlexNet, GoogLeNet, VGG-Net, etc.

Figure 4:
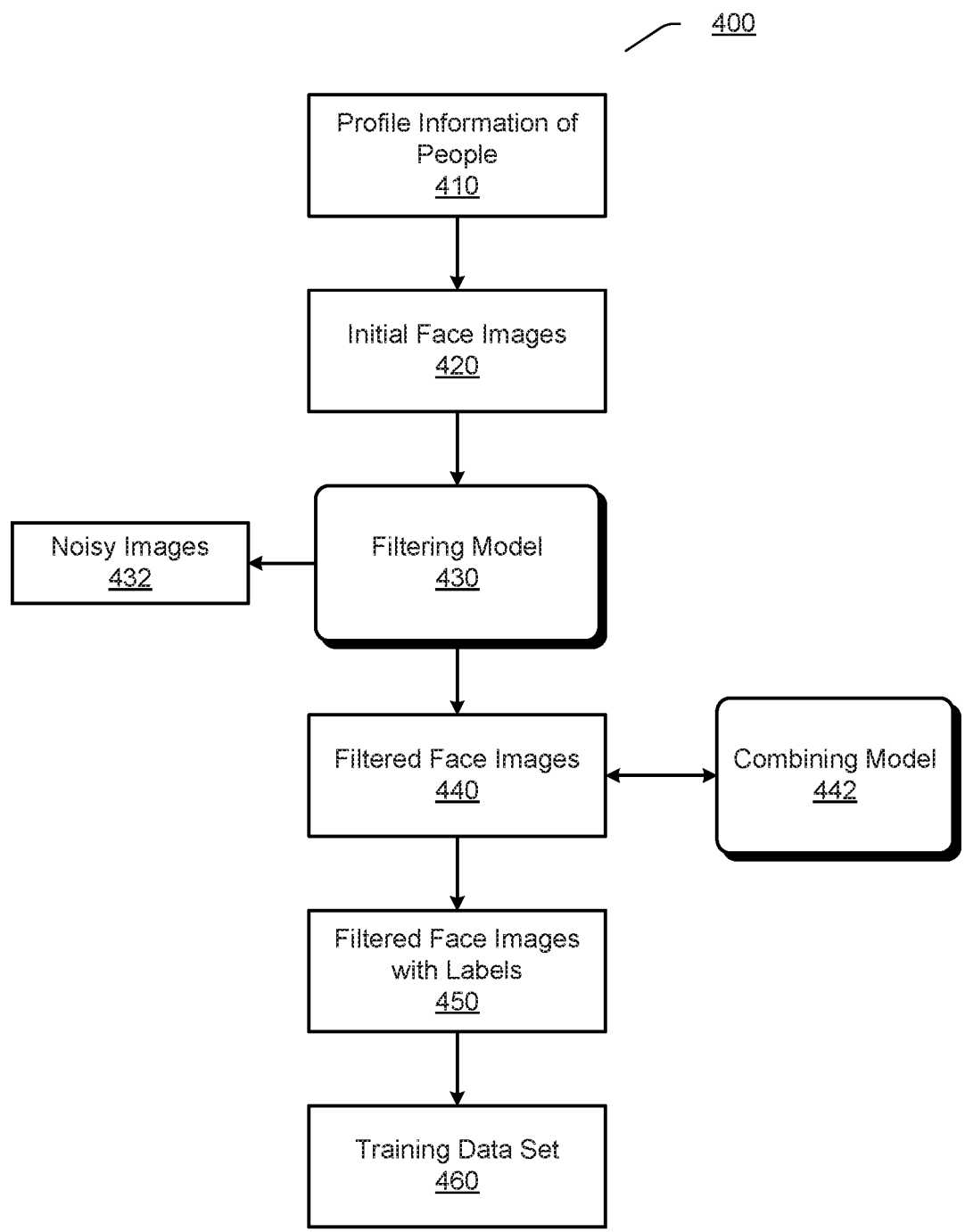
FIG. 4 illustrates an exemplary process for generating training data set for face recognition according to an embodiment.

FIG. 4 illustrates an exemplary process 400 for generating training data set for face recognition according to an embodiment. Herein the face recognition may be performed on face of a person and is an example of object recognition.

At 410, profile information of a plurality of people may be obtained. Preferably, the plurality of people may be selected from public figures, for example, profile information of some public figures may be obtained from knowledge graph and/or information sources, to follow General Data Protection Regulation (GDPR) and privacy policies.

At 420, for each person, a group of initial face images associated with the person may be collected based at least on the profile information of the person. For example, the group of initial face images associated with the person may be searched and collected on the network through a search engine, such as Bing, Google, Baidu, and so on. As another example, the group of initial face images associated with the person may be identified from at least one web page.

At 430, the profile information obtained at 410 and the group of initial face images collected at 420 may be provided to a filtering model to filter the initial face images. For example, the filtering model may filter out noisy images at 432 from the initial face images.

At 440, through the filtering performed by the filtering mode at 430, filtered face images may be obtained for each person. Herein a plurality of groups of filtered face images for the plurality of people may be obtained.

Optionally, the plurality of groups of filtered face images may be fed to a combining model, as shown by 442. The combining model may combine different groups of filtered face images each associated with a same person into one group of filtered face images and provide the combined group of filtered face images for the same person as the filtered face images obtained at 440. Further, the combining model may also combine the same profile information or different profile information each associated with the same person to provide combined profile information for the same person, such as combined identity information. In some other implementations, the combining model may combine different groups of filtered images each associated with a same category into one group of filtered images and provide combined group of filtered images and/or combined identity information for the same category. In some examples, the combining model may be configured to calculate relevance between a group of filtered images associated with an object and another group of filtered images associated with another object among the plurality of objects, and if the relevance meets a predetermined criterion, combine the identity information of the object and identity information of the another object into combined identity information, and combine the group of filtered images and the another group of filtered images into a combined group of filtered images. Herein the plurality of objects may be represented by the plurality of people, the filtered images may be represented by the filtered face images of people, and the identity information of the object may be represented by name of each person.

At 450, a group of filtered face images with labels, for example, each shown as a training data pair <image, label or identity information>, may be generated through labeling each of the group of filtered face images with the identity information of the person. An example of the training data pair herein may be shown as <image, name of the person>. In an alternative case, the group of training data pair corresponding to a person or an object may be generated through labeling each of the combined group of filtered images with the combined identity information.

At 460, the training data set may be obtained by adding the group of filtered face images with labels or the group of training data pairs.

Figure 5:
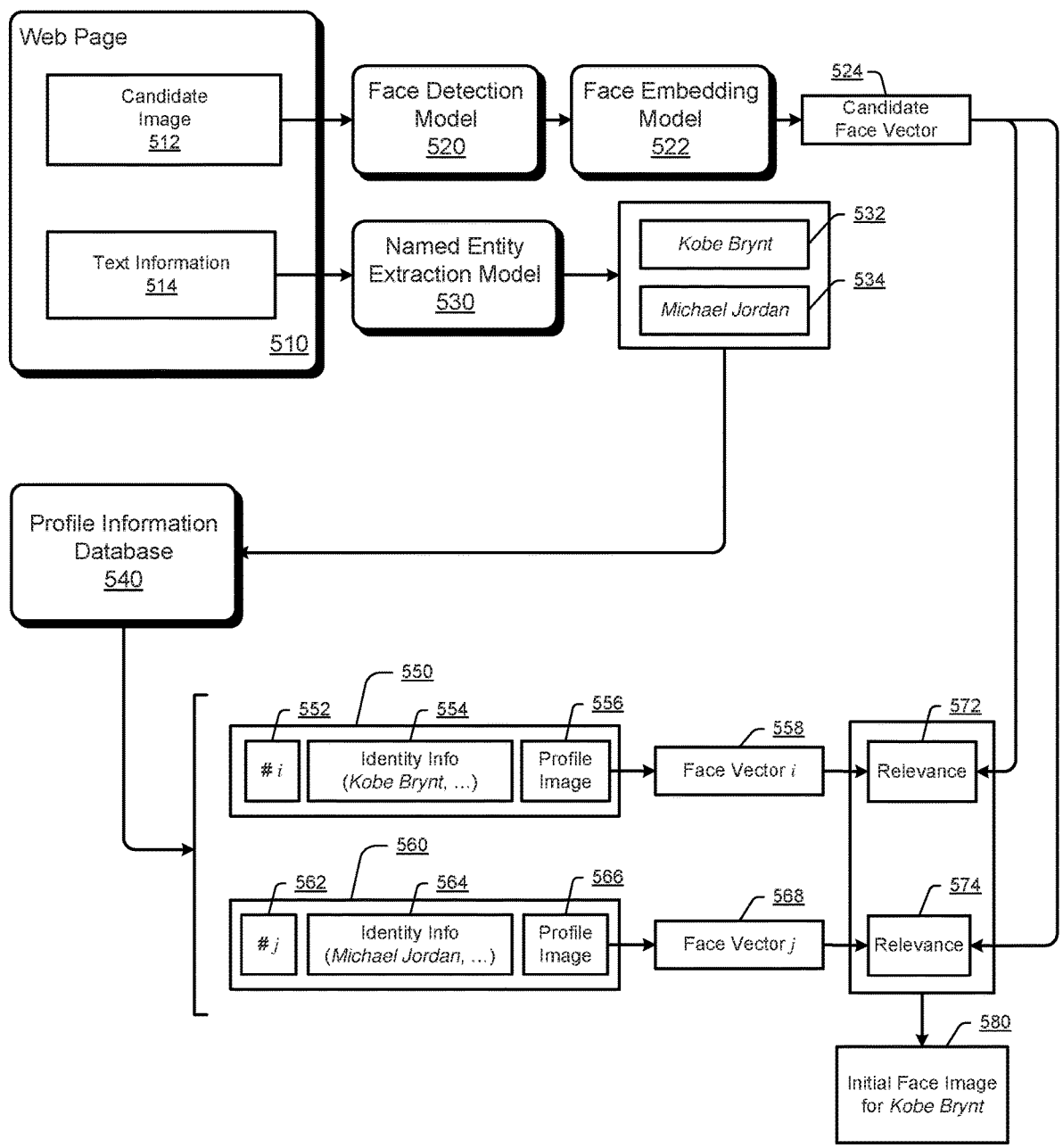
FIG. 5 illustrates an exemplary process for collecting initial face images according to an embodiment.

FIG. 5 illustrates an exemplary process 500 for collecting initial face images according to an embodiment. In FIG. 5, the initial face images may be collected from at least one web page 510, which is corresponding to operation 420 in FIG. 4.

As shown in FIG. 5, on the web page 510, there may be candidate image 512 and text information 514 for describing the candidate image 512. The candidate image 512 may be fed to a face detection model 520 to detect whether there is a face shown in the candidate image 512. The text information 514 may be fed to a named entity extraction model 530 to extract a name from the text information. Herein the face detection model 520 may be implemented through an object detection model, such as Region Convolutional Neural Network (RCNN), fast-RCNN, faster-RCNN or Single Shot MultiBox Detector (SSD). For example, it may add 5 landmarks to the face recognition model to predict coordinates of two eyes, one nose and mouth's left and right to recognize a face of an entity. The named entity extraction model 530 may be implemented through Natural Language Processing (NLP) techniques, such as Bidirectional Long Short-Term Memory (Bi-LSTM), Bidirectional Encoder Representation from Transformers (BERT) model, and so on. The named entity extraction model 530 may be utilized to find the object's name in a web-page on which an image is shown.

If there is a face detected from the candidate image 512 through the face detection model 520, then the candidate image 512 may be provided to a face embedding model 522. The face embedding model 522 may be included in an object recognition model, in particular, a face recognition model, and may extract and generate a candidate face vector 524 from the candidate image 512. The candidate face vector 524 may be provided to calculate relevance with a face vector of a profile image in a profile information database 540, such as relevance 572 and relevance 574.

Herein, through the named entity extraction model 530, there may be two names "Kobe Brynt" 532 and "Michael Jordan" 534 extracted from the text information 514. These two names "Kobe Brynt" 532 and "Michael Jordan" 534 may be provided to a profile information database 540 to determine which name in these two names is matched with the face shown on the candidate image 512.

The profile information database 540 may have multiple profile information items, such as 550, 560 shown in FIG. 5. Each profile information item may comprise a profile ID, such as #i 552 and #j 562, identity information, such as Identity Info (Kobe Brynt, . . . ) 554 and identity Info (Michael Jordan, . . . ) 564, and a profile image 556 for Kobe Brynt and a profile image 566 for Michael Jordan. Face vector i 558 of the profile image 556 and face vector j 568 of the profile image 566 may be generated, for example, through a face embedding model. The face vector i 558 may be provided to calculate relevance 572 with the candidate face vector 524. The face vector j 568 may be provided to calculate relevance with the candidate face vector 524. Each of the calculated relevance 572 and the calculated relevance 574 may be determined whether it meets a predetermined criterion through comparing with a threshold, to determine that the candidate image 512 may be mapped to which identity information item. In this example, the relevance 572, which corresponds to the identity information "Kobe Brynt", may meet a predetermined criterion, for example, more than the threshold, less than the threshold, or in a range of the thresholds, and the candidate image 512 may be considered and collected as an initial face image for Kobe Brynt, as shown at 580.

It should be understood that, although there is shown one candidate face vector representing one face on the candidate image, there may be several faces shown on one image and the exemplary process 500 may be implemented for each face on the image.

Figure 6:
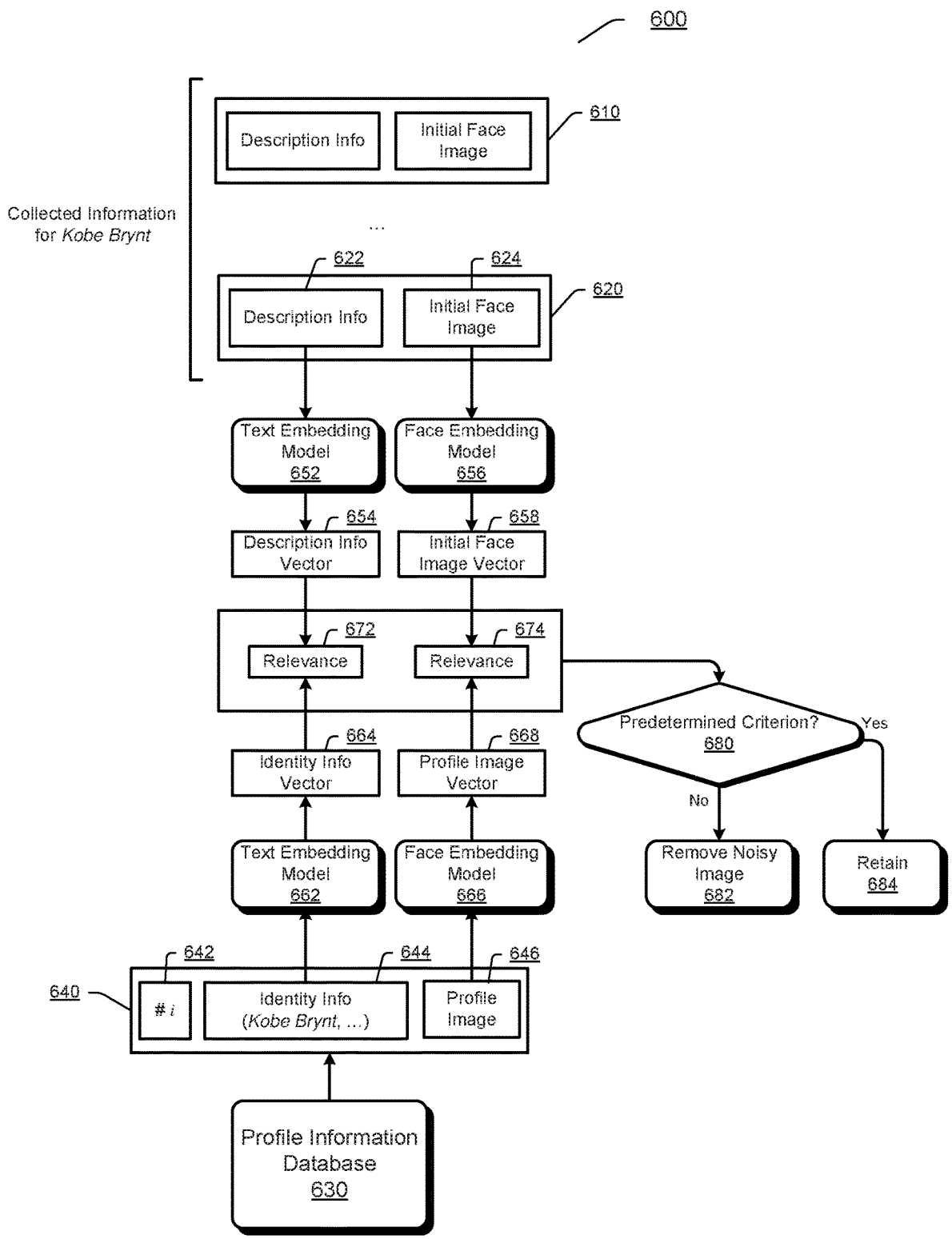
FIG. 6 illustrates an exemplary filtering model for filtering noisy images according to an embodiment.

FIG. 6 illustrates an exemplary filtering model 600 for filtering noisy images according to an embodiment. A person whose name is "Kobe Brynt" is taken as an example of an object described in connection with FIG. 6. The exemplary filtering model 600 may be implemented based on relevance between a profile image and an initial image.

As shown in FIG. 6, collected information for Kobe Brynt may comprise several information pairs of description information and initial face image, such as 610, 620. The description information 622 included in the information pair 620 may be inputted to a text embedding model 652, which is used to generate a description information vector 654 from the description information 622. The initial face image 624 included in the information pair 620 may be inputted to a face embedding model 656, which is used to generate an initial face image vector 658 from the initial face image 624. For example, the face embedding model 656 may be included in an object recognition model, in particular, a face recognition model. The description information vector 654 may be compared with an identity information vector 664, which is generated from identity information in a profile information database 630, to calculate and generate relevance 672. The initial face image vector 658 may be compared with a profile image vector 668, which is generated from profile image in the profile information database 630, to calculate and generate relevance 674.

The profile information database 630 may comprise multiple profile information items, each comprising at least a profile ID, identity information, and a profile image. For example, an exemplary profile information item 640 shown in FIG. 6 may comprise a profile ID, such as #i 642, identity information, such as Identity Info (Kobe Brynt, . . . ) 644, and a profile image 646. The identity information 644 may be provided to a text embedding model 662, to generate the identity information vector 664. The profile image 646 may be provided to a face embedding model 666, to generate the profile image vector 668.

Each of the relevance, such as relevance 672, 674, may be determined whether it meets a predetermined criterion as shown by 680. For example, it is determined whether the respective relevance is more than a threshold, less than a threshold, or in a range of thresholds. If the relevance meets the predetermined criterion, then the corresponding initial face image and/or its description information may be retained, as shown by 684. Otherwise, the corresponding initial face image may be determined as a noisy image and may be removed along with its description information, as shown by 682.

Figure 7:
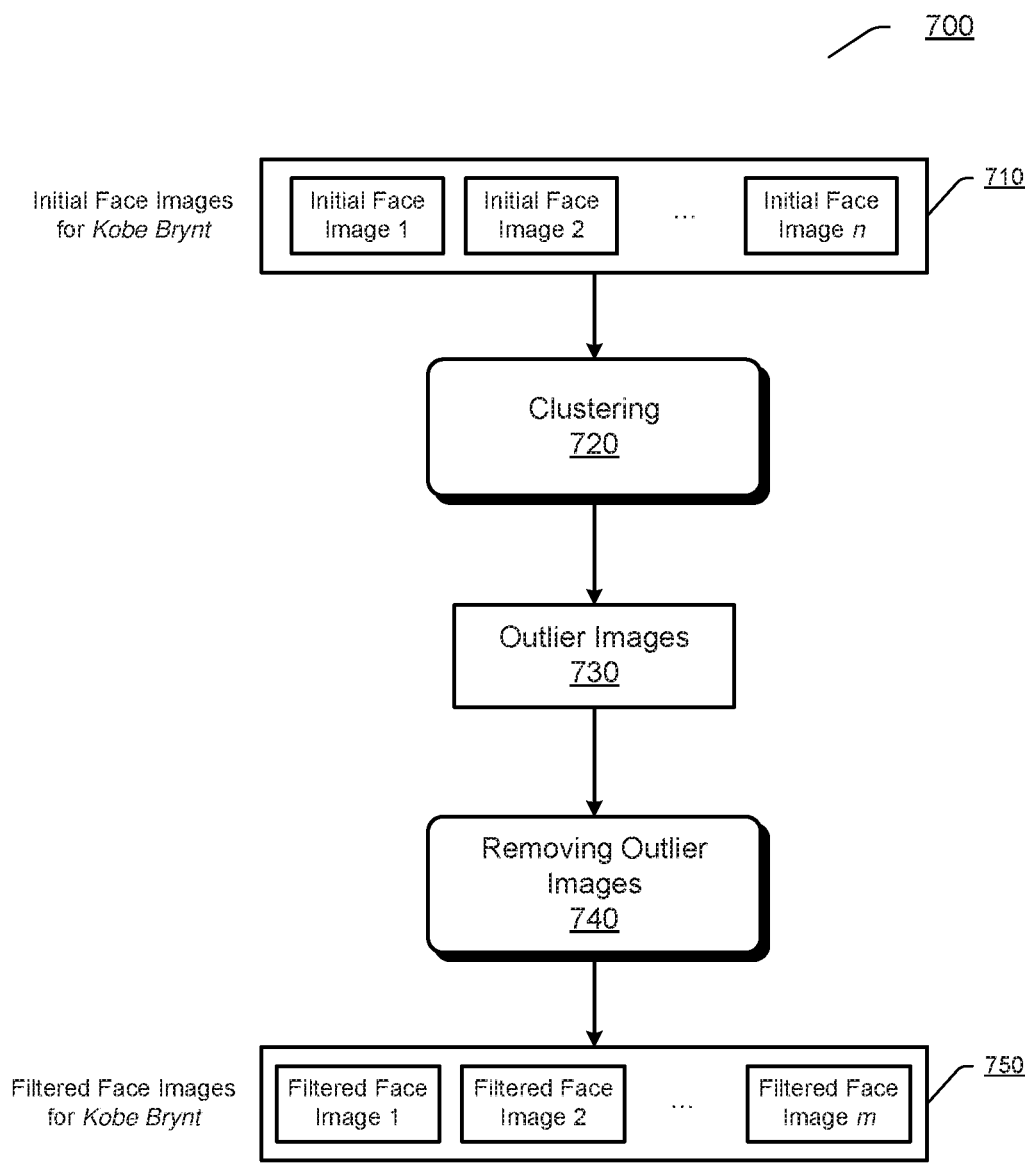
FIG. 7 illustrates another exemplary filtering model for filtering noisy images according to an embodiment.

FIG. 7 illustrates another exemplary filtering model 700 for filtering noisy images according to an embodiment. The exemplary filtering model 700 may be implemented based on clustering process for initial images.

As shown in FIG. 7, initial face images for Kobe Brynt may comprise a group of initial face images 710, including initial face image 1, initial face image 2, . . . , initial face image n.

The group of initial face images 710 may be processed by a clustering process 720. The clustering process 720 may be performed through, for example, density based clustering algorithm. Through the clustering process 720, at least one outlier image 730 in the group of initial face images 710 may be identified. The at least one outlier image 730 may be determined as noisy image and removed from the group of initial images 710, as shown by 740. When the at least one outlier image 730 is removed from the group of initial face images 710, a group of filtered face images 750 may be generated, for example, filtered face images for Kobe Brynt shown in FIG. 7, which comprise at least a filtered face image 1, a filtered face image 2, . . . , a filtered face image m, in which m may be no more than n.

It should be understood that, the filtering model 700 for filtering noisy images based on density based clustering algorithm shown in FIG. 7 may be one exemplary implementation, and any other clustering technique may be adopted in the filtering model if applicable, such as partitioning based clustering algorithm, hierarchical based clustering algorithm, and so on.

Figure 8:
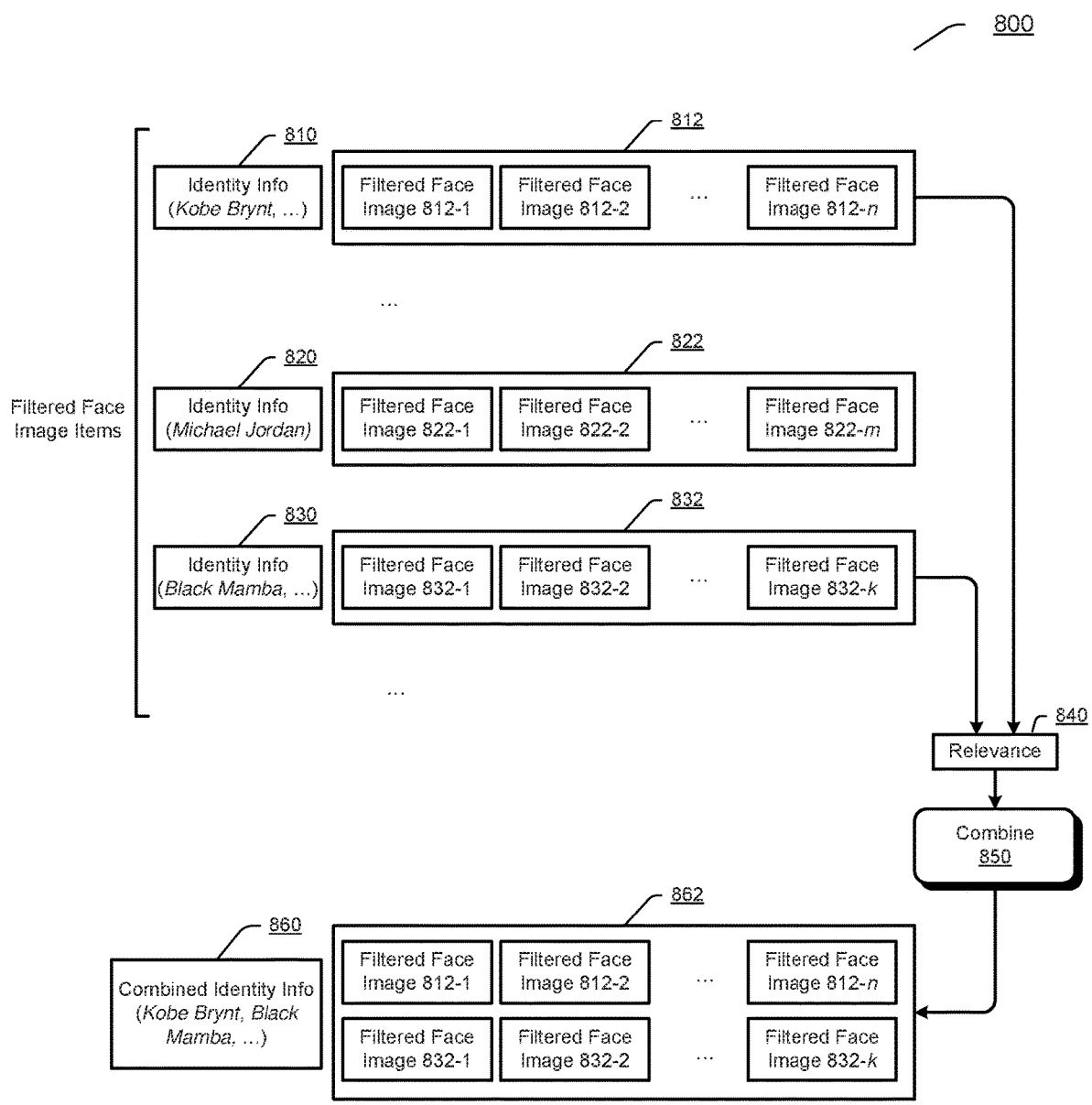
FIG. 8 illustrates an exemplary combining model for combining filtered images for the same object according to an embodiment.

FIG. 8 illustrates an exemplary combining model 800 for combining filtered images for the same object according to an embodiment.

There are multiple filtered face image items shown in FIG. 8. Each of the filtered face image items may comprise a pair of identity information and a filtered face image group. For example, the multiple filtered face image items shown in FIG. 8 may comprise several pairs of <identity info (Kobe Brynt, . . . ) 810, a filtered face image group 812>, <identity info (Michael Jordan) 820, a filtered face image group 822>, . . . , <identity info (Black Mamba, . . . ) 830, a filtered face image group 832>. As shown in FIG. 8, the filtered face image group 812 may comprise filtered face images 812-1, 812-2, . . . , 812-*n*; the filtered face image group 822 may comprise filtered face images 822-1, 822-2, . . . , 822-*m*; and the filtered face image group 832 may comprise filtered face images 832-1, 832-2, . . . , 832-*k*.

Relevance between any two filtered face image groups may be calculated. Relevance 840 between filtered face image groups 812 and 832 is shown as an example herein. It is determined whether the relevance meets a predetermined criterion, by for example comparing it with a threshold, such as more than a threshold, less than a threshold, and so on. For example, relevance between filtered face image groups 812 and 822 may be calculated and be considered as not meeting a predetermined criterion, as there may be no or little relevance between them. As another example, since name "Black Mamba" is a nickname of a person "Kobe Brynt", the filtered face image groups 812 and 832 may be for the same person "Kobe Brynt" and thus relevance between these two groups may be calculated as higher than a threshold, that means, the relevance meets a predetermined criterion. In this example, the two filtered face image groups 812 and 832 may be combined together, as shown by 850, to generate a combined filtered face image group 862. Additionally or alternatively, the identity information 810 associated with the filtered face image groups 812 and the identity information 830 associated with the filtered face image groups 832 may be combined together as a combined identity information (Kobe Brynt, Black Mamba, . . . ) 860. The original filtered face image items comprising identity information 810, 830 and filtered face image groups 812, 832 respectively may be cancelled from the multiple filtered face image items. As an alternative way, any one of the identity information 810, 830 may be replaced by the combined identity information, and the other may be cancelled. Any one of the filtered face image groups 812, 832 may be replaced by the combined filtered face image group, and the other may be cancelled.

Figure 9:
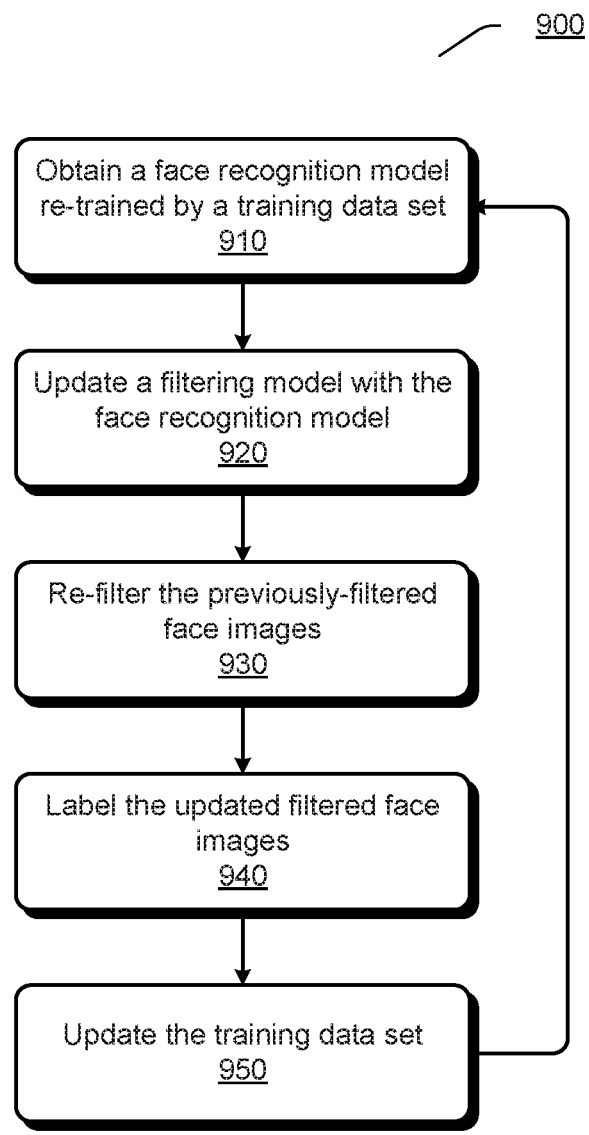
FIG. 9 illustrates an exemplary process for updating the training data set and a face recognition model according to an embodiment.

FIG. 9 illustrates an exemplary process 900 for updating a training data set and a face recognition model according to an embodiment.

At 910, a face recognition model may be obtained through being re-trained by a training data set.

At 920, a filtering model may be updated with the obtained face recognition model.

At 930, the previously-filtered group of face images may be re-filtered, through the updated filtering model, to obtain an updated group of filtered face images.

At 940, the updated group of filtered face images may be labeled with the identity information to generate an updated group of training data pairs.

At 950, a training data set may be updated with the updated group of training data pairs. The updated training data set may be fed back to the face recognition model to re-train the face recognition model.

It should be understood that, although the above described technique in connection with face recognition may be used for recognizing individual object from multiple objects, for example, identifying individual person among a plurality of images of people. The present disclosure may be also utilized to collect or generate a training data set for category, for example, all of people shown in images may be identified as "human" category, not respective identity information for individual person, and all of cats shown in images may be identified as "cat" category, and so on. A process for generating a training data set for category may be described below in connection with FIG. 10.

Figure 10:
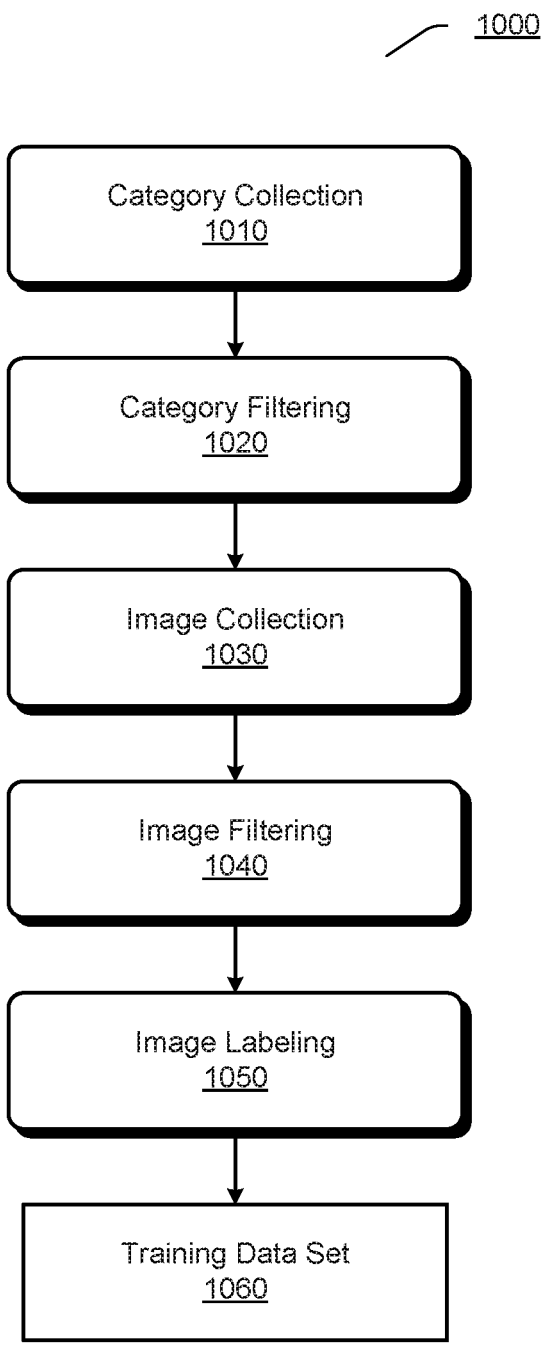
FIG. 10 illustrates an exemplary process for generating training data set for category recognition according to an embodiment.

FIG. 10 illustrates an exemplary process 1000 for generating training data set for category recognition according to an embodiment.

At 1010, category may be collected as many as possible from various database and/or sources, for example, collected from open sources, such as WordNet, ImageNet, collected through search engine by Top Queries, Top Entities from network, and so on. The category may comprise various categories, such as cat, flower, human, cup, book, and so on.

At 1020, the collected categories may be filtered through a classifier based on a predetermined rule, such as category text features, image content features, WordNet attributes, and so on. For example, non-visual categories and/or non-learnable categories may be filtered, such as following categories: abstract concept, clipart, cartoon image, portrait image, text on an image, posters, and adult or pornography images, etc.

At 1030, as for each category, images may be collected, for example, from network through a search engine and/or from web page through a crawler. The image collection for each category may be similar to the above described image collection for object, such as operation 220 in FIG. 2, operation 420 in FIG. 4, and the collection process shown in FIG. 5.

At 1040, noisy images may be filtered out from the collected images. In some examples, the image filtering process at 1040 may be performed based on relevance between a collected image and a profile image, which may be similar to the process implemented by the filtering model 600 in FIG. 6. In some other examples, the image filtering process at 1040 may be performed based on clustering process, such as through density based clustering algorithm, which is similar to the process implemented by the filtering model 700 in FIG. 7.

At 1050, each of the filtered images may be labeled with category information to generate a group of training data pairs corresponding to the category. The category information may comprise, for example but not limited to, name of the category, feature or attribute of the category, and so on. In some examples, the training data pairs may be shown as a pair of <image, category information>.

At 1060, a training data set may be generated based on the group of training data pairs, for example, adding the group of training data pairs into the training data set.

It should be understood that, although the above discussed technique is with respect to generating training data set for category, it can be also utilized to generate training data set for subcategory in a similar way. For example, the category may be represented by dog, and the subcategory may be represented by Huskie, Shepherd Dog, Golden Retriever, and so on.

Figure 11:
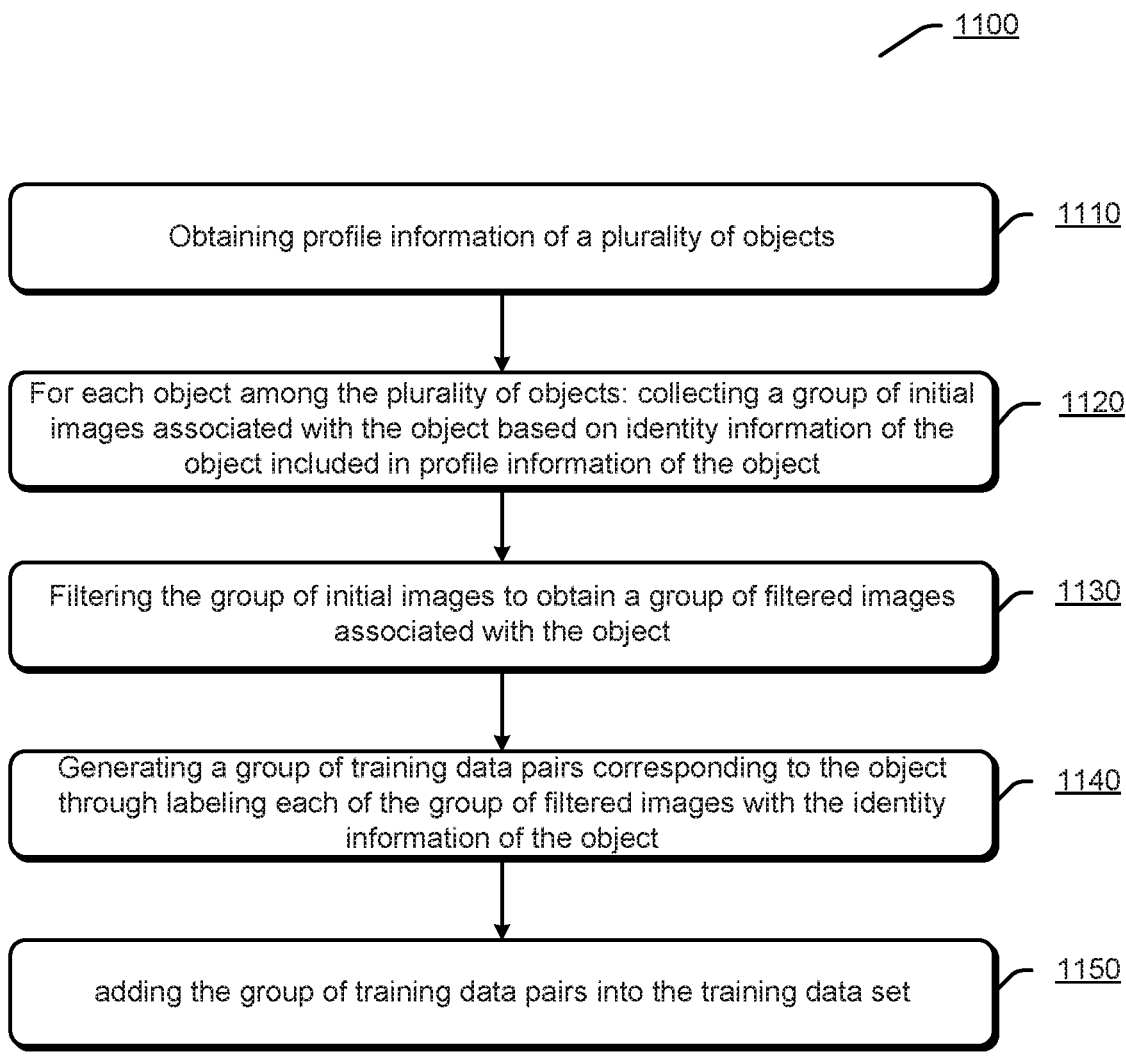
FIG. 11 illustrates a flowchart of an exemplary method for generating training data set according to an embodiment.

FIG. 11 illustrates a flowchart of an exemplary method 1100 for automatically generating a training data set for object recognition according to an embodiment.

At 1110, profile information of a plurality of objects may be obtained.

For each object among the plurality of objects, there are following operations.

At 1120, a group of initial images associated with the object may be collected based on identity information of the object included in profile information of the object.

At 1130, the group of initial images may be filtered to obtain a group of filtered images associated with the object.

At 1140, a group of training data pairs corresponding to the object may be generated through labeling each of the group of filtered images with the identity information of the object.

At 1150, the group of training data pairs may be added into the training data set.

In an implementation, the profile information of the plurality of objects is obtained from a pre-established knowledge graph.

In an implementation, the profile information of the plurality of objects is obtained from one or more information sources on the network.

In an implementation, the collecting operation 1120 comprises searching for initial images associated with the object on the network through a search engine.

In an implementation, the collecting operation 1120 comprises: identifying initial images associated with the object from at least one web page.

In an implementation, the identifying operation comprises: determining whether the at least one web page comprises at least one named entity corresponding to the object through named entity extraction algorithm; extracting a candidate image from the at least one web page; calculating relevance between the candidate image and a profile image in the profile information of the object; and if the relevance meets a predetermined criterion, determining the candidate image as an initial image associated with the object.

In an implementation, the filtering operation 1130 comprises: filtering out noisy images from the group of initial images.

In an implementation, wherein the filtering out comprises, for each initial image of the group of initial images: calculating at least one of: a first relevance between a profile image of the object included in the profile information of the object and the initial image; and a second relevance between the identity information of the object and description information of the initial image; and if the first relevance and/or the second relevance cannot meet a predetermined criterion, determining the initial image as an noisy image and removing the initial image from the group of initial images.

In an implementation, the filtering out comprises: performing clustering process to the group of initial images to identify at least one outlier image; and determining the at least one outlier image as a noisy image and removing the at least one outlier image from the group of initial images.

In an implementation, the method 1100 may further comprise calculating relevance between the group of filtered images associated with the object and another group of filtered images associated with another object among the plurality of objects; and if the relevance meets a predetermined criterion, combining the identity information of the object and identity information of the another object into a combined identity information, and combining the group of filtered images and the another group of filtered images into a combined group of filtered images.

In an implementation, the generating operation 1140 comprises: generating the group of training data pairs corresponding to the object through labeling each of the combined group of filtered images with the combined identity information.

In an implementation, the filtering operation 1130 comprises: generating a group of image vectors corresponding to the group of initial images respectively, and filtering the group of initial images based at least on the group of image vectors.

In an implementation, the group of image vectors is generated through an object recognition model.

In an implementation, the method 1100 further comprises: obtaining the object recognition model re-trained by the training data set; re-filtering the group of filtered images by at least employing the re-trained object recognition model, to obtain an updated group of filtered images; generating an updated group of training data pairs corresponding to the object through labeling each of the updated group of filtered images with the identity information of the object; and updating the training data set with the updated group of training data pairs.

It should be appreciated that the method 1100 may further comprise any steps/processes for automatically generating a training data set for object recognition according to the embodiments of the present disclosure as mentioned above.

Figure 12:
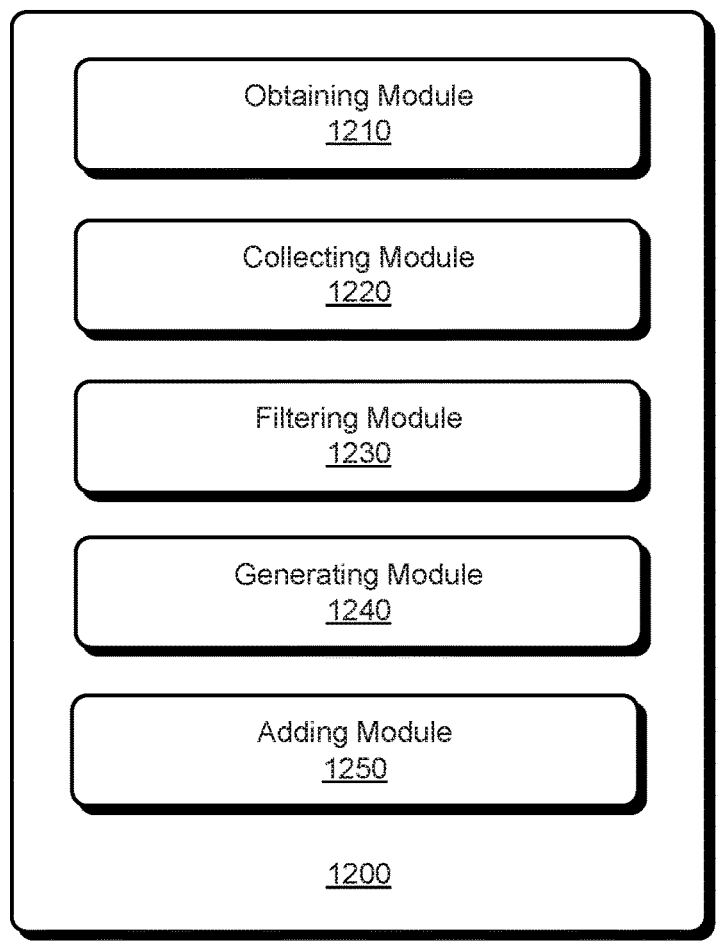
FIG. 12 illustrates an exemplary apparatus for generating training data set according to an embodiment.

FIG. 12 illustrates an exemplary apparatus 1200 for automatically generating a training data set for object recognition according to an embodiment.

The apparatus 1200 may comprise: an obtaining module 1210, for obtaining profile information of a plurality of objects; for each object among the plurality of objects: a collecting module 1220, for collecting a group of initial images associated with the object based on identity information of the object included in profile information of the object; a filtering module 1230, for filtering the group of initial images to obtain a group of filtered images associated with the object; a generating module 1240, for generating a group of training data pairs corresponding to the object through labeling each of the group of filtered images with the identity information of the object; and an adding module 1250, for adding the group of training data pairs into the training data set.

In an implementation, the collecting module 1220 comprises: a searching module, for searching for initial images associated with the object on the network through a search engine.

In an implementation, the collecting module 1220 comprises: an identifying module, for identifying initial images associated with the object from at least one web page.

In an implementation, the filtering module 1230 comprises: a noisy image filtering module, for filtering out noisy images from the group of initial images.

In an implementation, the filtering module 1230 comprises: an image vector generating module, for generating a group of image vectors corresponding to the group of initial images respectively; and wherein the filtering module is further for filtering the group of initial images based at least on the group of image vectors.

Moreover, the apparatus 1200 may also comprise any other modules configured for automatically generating a training data set for object recognition according to the embodiments of the present disclosure as mentioned above.

Figure 13:
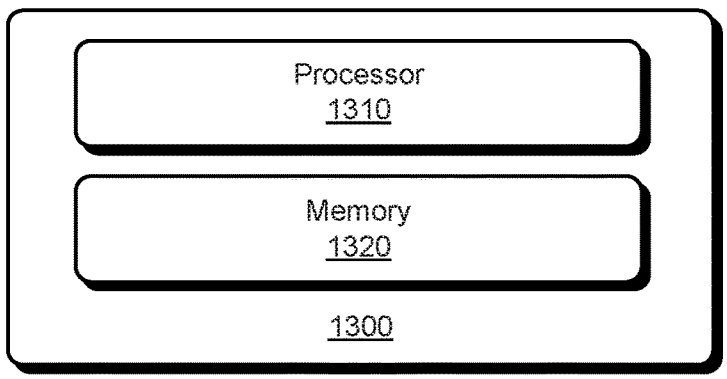
FIG. 13 illustrates another exemplary apparatus for generating training data set according to an embodiment.

FIG. 13 illustrates another exemplary apparatus 1300 for automatically generating a training data set for object recognition according to an embodiment.

The apparatus 1300 may comprise at least one processor 1310. The apparatus 1300 may further comprise a memory 1320 that is connected with the processor 1310. The memory 1320 may store computer-executable instructions that, when executed, cause the processor 1310 to perform any operations of the methods for automatically generating a training data set for object recognition according to the embodiments of the present disclosure as mentioned above.

The embodiments of the present disclosure may be embodied in a non-transitory computer-readable medium. The non-transitory computer-readable medium may comprise instructions that, when executed, cause one or more processors to perform any operations of the methods for assisting psychological cure in automated chatting according to the embodiments of the present disclosure as mentioned above.

It should be appreciated that all the operations in the methods described above are merely exemplary, and the present disclosure is not limited to any operations in the methods or sequence orders of these operations, and should cover all other equivalents under the same or similar concepts.

It should also be appreciated that all the modules in the apparatuses described above may be implemented in various approaches. These modules may be implemented as hardware, software, or a combination thereof. Moreover, any of these modules may be further functionally divided into sub-modules or combined together.

Processors have been described in connection with various apparatuses and methods. These processors may be implemented using electronic hardware, computer software, or any combination thereof. Whether such processors are implemented as hardware or software will depend upon the particular application and overall design constraints imposed on the system. By way of example, a processor, any portion of a processor, or any combination of processors presented in the present disclosure may be implemented with a microprocessor, microcontroller, digital signal processor (DSP), a field-programmable gate array (FPGA), a programmable logic device (PLD), a state machine, gated logic, discrete hardware circuits, and other suitable processing components configured to perform the various functions described throughout the present disclosure. The functionality of a processor, any portion of a processor, or any combination of processors presented in the present disclosure may be implemented with software being executed by a microprocessor, microcontroller, DSP, or other suitable platform.

Software shall be construed broadly to mean instructions, instruction sets, code, code segments, program code, programs, subprograms, software modules, applications, software applications, software packages, routines, subroutines, objects, threads of execution, procedures, functions, etc. The software may reside on a computer-readable medium. A computer-readable medium may include, by way of example, memory such as a magnetic storage device (e.g., hard disk, floppy disk, magnetic strip), an optical disk, a smart card, a flash memory device, random access memory (RAM), read only memory (ROM), programmable ROM (PROM), erasable PROM (EPROM), electrically erasable PROM (EEPROM), a register, or a removable disk. Although memory is shown separate from the processors in the various aspects presented throughout the present disclosure, the memory may be internal to the processors, e.g., cache or register.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein. All structural and functional equivalents to the elements of the various aspects described throughout the present disclosure that are known or later come to be known to those of ordinary skill in the art are expressly incorporated herein by reference and are intended to be encompassed by the claims.

What is claimed is:

1. A method for automatically generating a training data set for object recognition, comprising:
    obtaining profile information for a plurality of objects; and
    for each object from the plurality of objects:
        collecting a group of initial images associated with the object based on an identity information of the object included in the profile information of the object;
        filtering the group of initial images to obtain a group of filtered images associated with the object, wherein filtering the group of initial images further comprises, for each initial image:
            calculating a first relevance score based on a similarity between the initial image and an image in the profile information of the object;
            calculating a second relevance score based on a similarity between a description of the initial image and a description of the image in the profile information of the object;
            determining that the initial image is a noisy image based on the first relevance score and the second relevance score; and
            removing the initial image from the group of initial images in response to the determining that the initial image is a noisy image;
        generating a group of training data pairs corresponding to the object by labeling each of the group of filtered images with the identity information of the object;
        adding the group of training data pairs into the training data set; and
    training an image recognition model based on the training data set, wherein the trained image recognition model is configured to perform image recognition for an input image.

2. The method of claim 1, wherein the profile information of the plurality of objects is obtained from a pre-established knowledge graph.

3. The method of claim 1, wherein the profile information of the plurality of objects is obtained from one or more information sources on a network.

4. The method of claim 1, wherein collecting the group of initial images comprises:
    searching for the initial images associated with the object on a network through a search engine.

5. The method of claim 1, wherein collecting the group of initial images comprises:
    identifying the initial images associated with the object from at least one web page.

6. The method of claim 1, wherein filtering the group of initial images comprises:
    performing clustering process to the group of the initial images to identify at least one outlier image; and
    determining the at least one outlier image as a noisy image and removing the at least one outlier image from the group of initial images.

7. The method of claim 1, further comprising:
    calculating relevance between the group of filtered images associated with the object and another group of filtered images associated with another object among the plurality of objects; and
    if the relevance meets a predetermined criterion, combining the identity information of the object and identity information of the another object into a combined identity information, and combining the group of filtered images and the another group of filtered images into a combined group of filtered images.

8. The method of claim 7, wherein generating the group of training data pairs comprises:
    generating the group of training data pairs corresponding to the object through by labeling each of the combined group of filtered images with the combined identity information.

9. The method of claim 1, wherein filtering the group of initial images comprises:
    generating a group of image vectors corresponding to the group of initial images respectively; and
    filtering the group of initial images based on the group of image vectors.

10. The method of claim 9, wherein the group of image vectors is generated by an object recognition model.

11. The method of claim 10, wherein the method further comprises:
    re-filtering the group of filtered images by employing the trained object recognition model to obtain an updated group of filtered images;

generating an updated group of training data pairs corresponding to the object through labeling each of the updated group of filtered images with the identity information of the object; and updating the training data set with the updated group of training data pairs.

12. An apparatus for automatically generating a training data set for object recognition, comprising:

a memory comprising instructions; and one or more computer processors, wherein the instructions, when executed by the one or more computer processors, cause the apparatus to perform operations comprising:

obtaining profile information for a plurality of objects; and for each object among the plurality of objects:

collecting a group of initial images associated with the object based on an identity information of the object included in the profile information of the object;

filtering the group of initial images to obtain a group of filtered images associated with the object, wherein filtering the group of initial images further comprises, for each initial image:

calculating a first relevance score based on a similarity between the initial image and an image in the profile information of the object;

calculating a second relevance score based on a similarity between a description of the initial image and a description of the image in the profile information of the object;

determining that the initial image is a noisy image based on the first relevance score and the second relevance score; and removing the initial image from the group of initial images in response to the determining that the initial image is a noisy image generating a group of training data pairs corresponding to the object by labeling each of the group of filtered images with the identity information of the object;

adding the group of training data pairs into the training data set; and training an image recognition model based on the training data set, wherein the trained image recognition model is configured to perform image recognition for an input image.

13. The apparatus of claim 12, wherein the instructions further cause the one or more computer processors to perform operations comprising:

searching for the initial images associated with the object on a network through a search engine.

14. The apparatus of claim 12, wherein the instructions further cause the one or more computer processors to perform operations comprising:

identifying the initial images associated with the object from at least one web page.

15. The apparatus of claim 12, wherein the instructions further cause the one or more computer processors to perform operations comprising:

filtering out noisy images from the group of initial images.

16. The apparatus of claim 12, wherein the instructions further cause the one or more computer processors to perform operations comprising:

generating a group of image vectors corresponding to the group of initial images respectively; and filtering the group of initial images based on the group of image vectors.

17. A non-transitory machine-readable storage medium including instructions that, when executed by a machine, cause the machine to perform operations comprising:

obtaining profile information for a plurality of objects; and for each object from the plurality of objects:

collecting a group of initial images associated with the object based on an identity information of the object included in the profile information of the object;

filtering the group of initial images to obtain a group of filtered images associated with the object, wherein filtering the group of initial images further comprises, for each initial image:

calculating a first relevance score based on a similarity between the initial image and an image in the profile information of the object;

calculating a second relevance score based on a similarity between a description of the initial image and a description of the image in the profile information of the object;

determining that the initial image is a noisy image based on the first relevance score and the second relevance score; and removing the initial image from the group of initial images in response to the determining that the initial image is a noisy image;

generating a group of training data pairs corresponding to the object by labeling each of the group of filtered images with the identity information of the object;

adding the group of training data pairs into a training data set; and training an image recognition model based on the training data set, wherein the trained image recognition model is configured to perform image recognition for an input image.

* * * * *